Nov. 10, 1925.
G. INGENTHRON
WIRE REEL TRUCK
Filed March 19, 1925
1,561,160
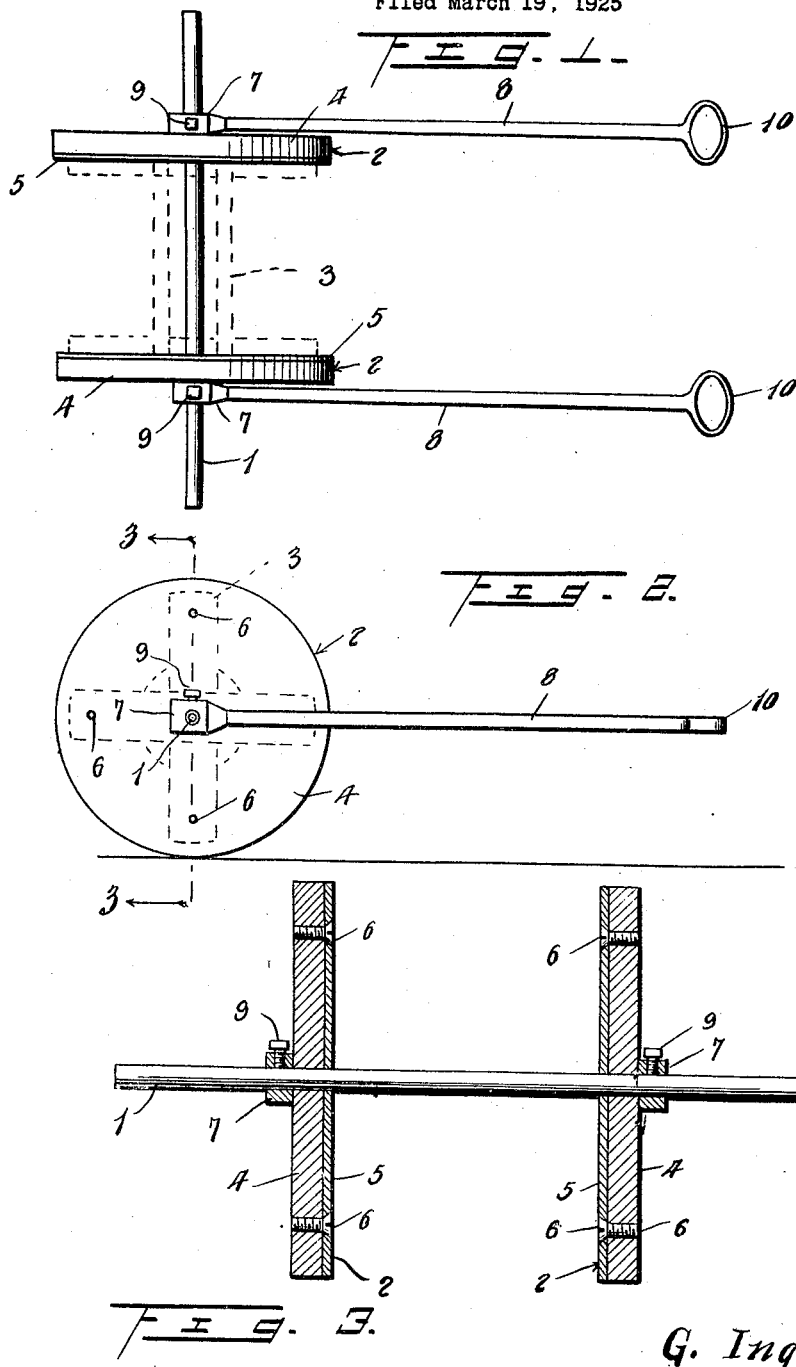
Inventor
G. Ingenthron
By
Attorney Patented Nov. 10, 1925.

1,561,160

UNITED STATES PATENT OFFICE.

GEORGE INGENTHRON, OF HERMOSA, SOUTH DAKOTA.

WIRE-REEL TRUCK.

Application filed March 19, 1925. Serial No. 16,744.

*To all whom it may concern:*

Be it known that I, GEORGE INGENTHRON, a citizen of the United States, residing at Hermosa, in the county of Custer and State of South Dakota, have invented certain new and useful Improvements in Wire-Reel Trucks; and I do hereby declare the following to be a full, clear, and exact description of the invention, such as will enable others skilled in the art to which it appertains to make and use the same.

This invention relates to wire reel trucks, and has for one of its objects to improve and simplify the general construction of devices of this character and to provide one that shall be adjustable so as to permit it to support one or more spools of barbed wire.

With the above and other objects in view, the invention consists of the construction, combination and arrangement of parts hereinafter fully described and claimed, and illustrated in the accompanying drawing, wherein:

Figure 1 is a top plan view of a wire reel truck constructed in accordance with my invention, Figure 2 is a view in side elevation of the truck, and Figure 3 is a sectional view taken on the plane indicated by the line 3—3 of Figure 2.

Corresponding and like parts are referred to in the following description, and designated in the several views of the drawing, by similar reference characters.

In the drawing 1 designates an axle upon which supporting wheels 2 and a wire supporting spool 3 are loosely mounted. The spool 3 is positioned upon the axle 1 between the wheels 2, and the axle is considerably longer than the spool. The wheels 2 comprise wood disks 4 and metal disks 5, the latter being secured to the inner sides of the former by bolts 6. The wood disks 4 are considerably thicker than the metal disks 5, and the latter prevent the spool 3 and the wire from contacting with and wearing the former. The wheels 2 may be spaced far enough apart to receive one, two or more spools, and are held in adjusted position by means of the inner enlarged ends 7 of handle bars 8. The handle bars 8 are arranged on the axle 1 outwardly beyond the wheels 2 and are adjustable along the length thereof to permit the wheels to be spaced the required distance apart. Set screws 9 are employed to secure the handle bars 8 in adjusted position. The handle bars 8 are provided at their outer ends with loops 10. The axle 1 is made of metal and is preferably hollow as shown in the drawing.

The axle 1 is removed from the wheels 2 and handle bars 8 to permit it to be passed through one or more spools of barbed wire. After this has been done, the wheels 2 are applied to the axle 1 with the metal disks 5 facing inwardly, and the handle bars 8 are thence applied to the axle 1 and secured thereto by the set screws 9. The wire may be unreeled from the spool or spools by pulling the truck along the ground. This may be done manually or if desired the loops 10 of the handle bars 8 may be engaged with two rear stakes of a farm wagon so as to permit the truck to be drawn over the ground by a horse.

From the foregoing description, taken in connection with the accompanying drawing, it should be apparent that one or more spools of wire may be readily arranged on the truck, and that the truck is simple, durable, efficient and inexpensive.

What is claimed is:—

1. A wire reel truck comprising an axle, wheels mounted upon the axle for rotation with respect thereto and for adjustment with respect to each other, and handle bars adjustably secured to the axle outwardly beyond the wheels.

2. A wire reel truck comprising an axle, wheels mounted on the axle for rotation thereon and relative adjustment, elements adjustably mounted on the axle outwardly beyond the wheels, means adapted to secure said elements in adjusted position, and handle bars connected to said elements.

3. A wire reel truck comprising an axle, wheels loosely mounted upon the axle, handle bars connected to the axle for adjustment along the length thereof, and means adapted to secure the handle bars in adjusted position.

4. A wire reel truck comprising an axle, wheels loosely mounted upon the axle and each embodying an outer disk of wood and an inner disk of metal, handle bars having their inner ends adjustably mounted upon the axle and provided at their outer ends with loops, and set screws carried by the inner ends of the handle bars for contact with the axle.

In testimony whereof I affix my signature.

GEORGE INGENTHRON.